United States Patent [19]

Perry

[11] Patent Number: 4,775,275

[45] Date of Patent: Oct. 4, 1988

[54] MOBILE BATCH PLANTS

[76] Inventor: L. F. Perry, Rte. 3, Box 28, Olney, Tex. 76374

[21] Appl. No.: 37,513

[22] Filed: Apr. 13, 1987

[51] Int. Cl.[4] .............................................. B65G 69/00

[52] U.S. Cl. ...................................... 414/21; 414/332; 414/503; 414/919; 366/18

[58] Field of Search ................... 414/469, 10, 919, 21, 414/501, 502, 519, 520, 546, 680, 683, 332; 222/609, 610, 608, 185, 160; 52/194, 197, 122.1, 143; 366/18, 30, 40, 41, 606, 141

[56] References Cited

U.S. PATENT DOCUMENTS

| | | | |
|---|---|---|---|
| 3,064,832 | 11/1962 | Heltzel | 414/332 |
| 3,154,202 | 10/1964 | Heltzel | 414/21 X |
| 3,295,698 | 1/1967 | Ross et al. | 414/21 |
| 3,343,688 | 9/1967 | Ross | 414/21 |
| 3,448,866 | 6/1969 | Perry et al. | 414/21 |
| 3,938,673 | 2/1976 | Perry, Jr. | 414/21 |
| 4,178,117 | 12/1979 | Brugler | 414/332 X |
| 4,253,256 | 3/1981 | Feliz | 414/503 X |
| 4,348,146 | 9/1982 | Brock | 414/919 X |
| 4,561,821 | 12/1985 | Dillman | 414/332 |
| 4,579,496 | 4/1986 | Gerlach | 414/21 |
| 4,619,531 | 10/1986 | Dunstan | 414/332 X |

*Primary Examiner*—Frank E. Werner

*Attorney, Agent, or Firm*—Laney, Dougherty, Hessin & Beavers

[57] ABSTRACT

An improved mobile batch plant that is entirely self-erecting and completely contained as operated between transport and functional modes by a single operator. A truck-towed main frame hingedly supports a tower assembly that includes cement storage and weigh bins and water storage and weigh tanks proximate a materials release point to be received by a mixer. An aggregate and/or sand hopper and conveyor are located forward on the main frame and these serve to move aggregate materials to the release point. A hydraulic linear actuator system operates to move the tower assembly between the vertical operational position and the horizontal transport position where conveyor and tower are compacted against the main frame.

6 Claims, 2 Drawing Sheets

MOBILE BATCH PLANTS

BACKGROUND OF THE INVENTION

1. Field of the Invention

The invention relates generally to mobile batch plants and, more particularly, but not by way of limitation, it relates to an improved form of mobile batch plant that is entirely self-powered to effect installation set-up or take-down between the road mobile and operational attitudes.

2. Description of the Prior Art

The prior art includes numerous types of mobile batch plants that have been developed variously in accordance with the exigencies of particular applications over a considerable period of time. Prior types of mobile batch plant have been available in varying assemblies of bin combinations, conveyors, control automation and the like; however, in all such prior cases set-up of installations has usually required outside help in some form of lifting or raising power to make a unit operational. One well known form of prior art plant is taught in U.S. Pat. No. 3,251,484 wherein various bin components of different sizes are disposed on an elongated main frame that is wheel supported for mobility but tiltable upward under auxiliary power or lift into an operational batch plant position. This type of operation fairly characterizes the prior art attempts at mobility and automation. A forerunner patent of the present inventor, U.S. Pat. No. 3,938,673, is of general interest.

SUMMARY OF THE INVENTION

The present invention relates to improvements in automated, mobile batch plants for providing a centralized concrete supply station to cement mixer trucks. The present invention includes a main frame supported at the rear end by wheel assembly and configured for fifth wheel towing. The forward end of the main frame includes an aggregate storage bin and power unit and a conveyor assembly is hingedly affixed to the main frame beneath the aggregate bin to convey material rearward and upward along the main frame. A tower assembly containing cement bins, water storage tank and weigh tank is extendable upright over the rear portion of the main frame while simultaneously supporting the rear end of the conveyor in the upward tilted attitude, and the tower assembly is hydraulically contolled to fold forward from a rear support post assembly into a compact mass folded closely against the main frame in readiness for roadway transport.

Therefore, it is an object of the present invention to provide a mobile batch plant with self-contained power for enabling operational set-up of the plant equipment.

It is yet another object of the present invention to provide an automated mobile batch plant that is economical and reliable yet fully capable of delivering large volumes of concrete mix per unit time.

It is still further an object of the invention to provide a mobile batch plant that can be more readily delivered and set-up at any of several work locations to provide accurately measured water, concrete and aggregate mix.

Finally, it is an object of the present invention to provide an automated mobile batch plant that can be delivered on site, and made totally ready for operation by a single person in a very short period of time.

Other objects and advantages of the invention will be evident from the following detailed description when read in conjunction with the accompanying drawings which illustrate the invention.

DETAILED DESCRIPTION OF THE INVENTION

Figure 2:
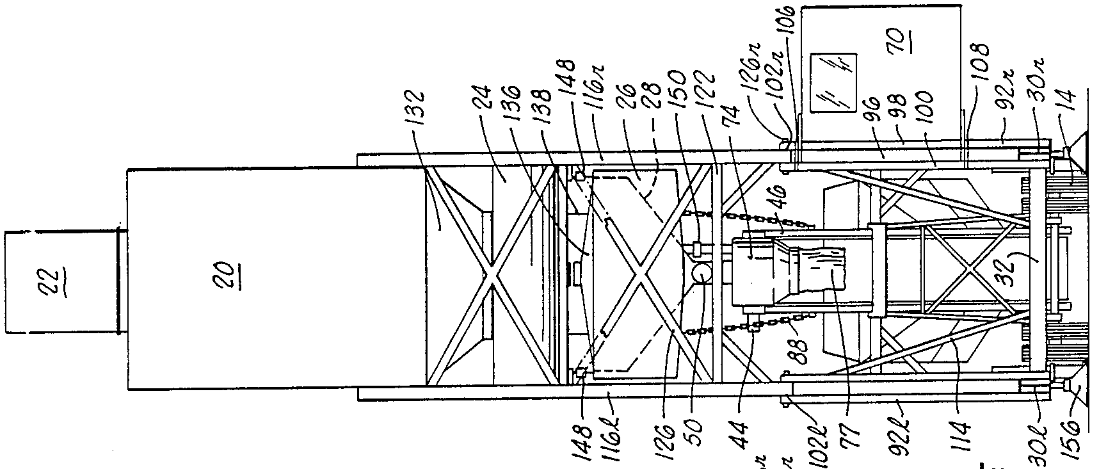
FIG. 2 is a rear end view in elevation of the batching plant of FIG. 1.
Figure 1:
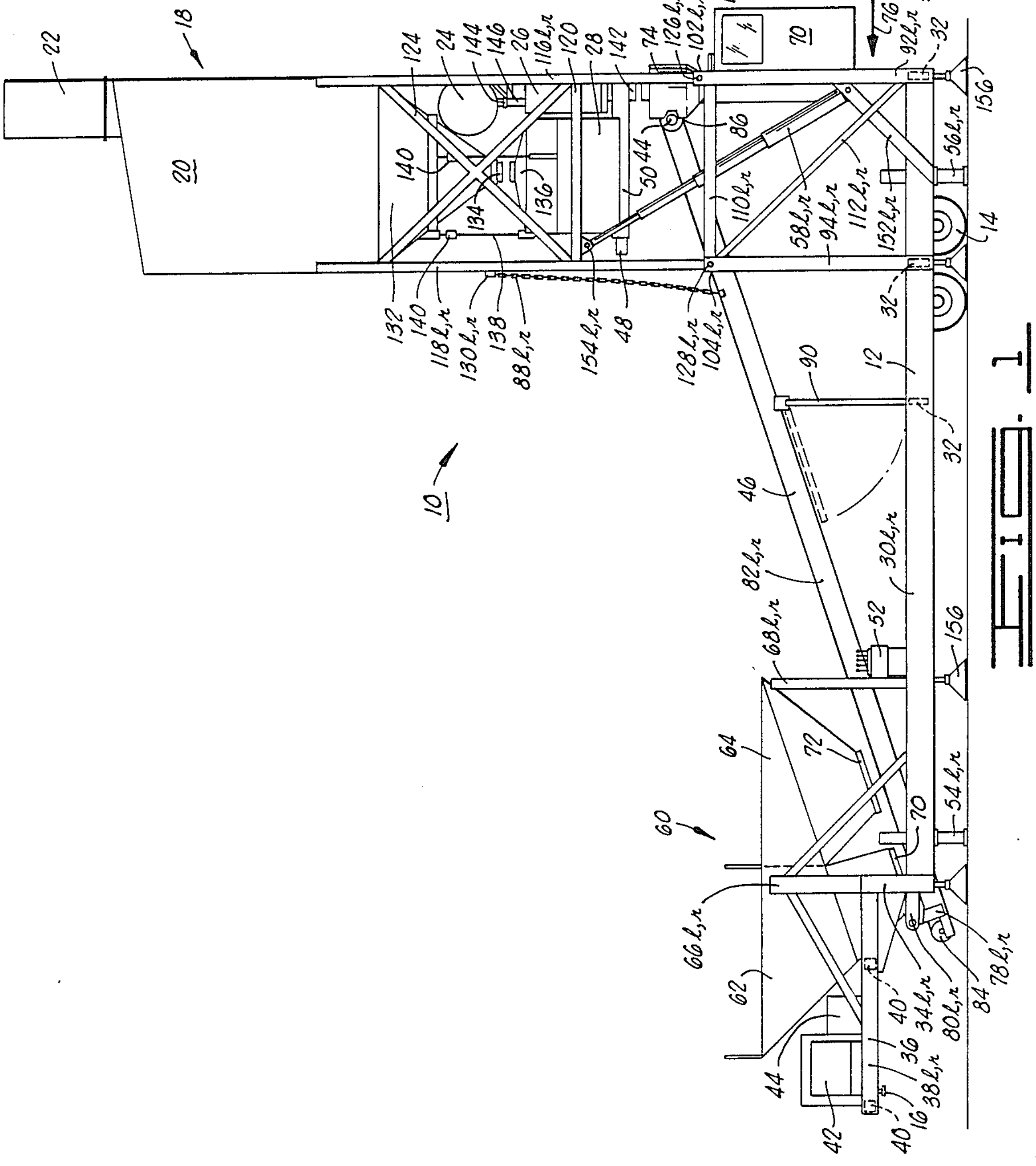
FIG. 1 is a side view in elevation of the mobile concrete batching plant in the set-up, operational attitude.

Referring to FIGS. 1 and 2, a mobile batch plant 10 consists of a main frame 12 having a rearward wheel assembly 14 and a forward tow connector 16. A rearward tower assembly 18 provides elevated support for a concrete bin 20 having a dust collector 22, as well as a water surge tank 24, water weigh tank 26 and a cement weigh bin 28.

The structure is essentially of rectangular formation, i.e. opposite sides appear identical although reversed, and left and right designations will be used to designate duplicate components. The main frame 12 is an elongated retangular frame consisting of opposite side I-beam frames 30-l,r and having an overall width of about eleven feet as interconnected by a plurality of transverse cross beams 32. The forward portion of main frame 12 includes a riser formed from vertical brace 34-l,r secured as by welding to opposite side frames 30-l,r and as further formed into upper platform 36 in support of tow connection 16. The upper platform 36 may be suitably formed from opposite side I-beams 38-l,r as fortified by suitable cross members 40.

A suitable decking is provided over the top surface of upper platform 36 in order to support the system power works. A gasoline engine 42, on the order of 40 to 50 horsepower, provides generator drive to produce an electrical output suitable for distribution in control of various solenoids about the apparatus 10. Power output from engine 42 also activates hydraulic and pneumatic systems as shown generally by housing 44 as these control modes are applied around the system.

Hydraulics are applied for variable speed control of the hydraulic motor 44 of conveyor 46 and the hydraulic motor 48 of screw feeder 50 leading centrally out of the bottom of cement weigh bin 28. Hydraulic power as controlled by various levers at control station 52 (FIG. 1) is also applied in control of forward jacks 54-l,r, rearward jacks 56-l,r, and the opposite side hydraulic hoist cylinders 58-l,r. The hydraulic linear actuators 58-l,r are each a three stage telescoping cylinder having 4, 5 and 6 inch telescoping stages; that is, hydraulic cylinders Model No. 63-2-84 as commercially available from Custom Hoists, Inc. of Haysville, Ohio.

The forward end of main frame 12 adjacent upper platform 36 includes an aggregate hopper 60 disposed over and functioning with conveyor 46. Hopper 60 is actually divided into two separate bins 62 and 64, e.g. for sand and course rock, as supported by upright posts 66-l,r and 68-l,r. Actually, the bin 60 is supported on posts 66 and 68 through a plurality of load cells which allow continual weight data to be transmitted to the control system in the doghouse 70, during decumulation of sand and/or aggregate, as will be further described. The lower release gates 70 and 72 of bin 62 and 64 are positioned adjacent the belt of conveyor 46, a conventional type of elongated rubber belt conveyor for moving the decumulated aggregate and/or sand upward to a funnel-type collector 74 which directs entry of the various constituents downward into a cement mixer as mounted on a truck. Truck access is by backing in under the collector 74 in the direction of arrow 76 to receive charge of the concrete materials. A canvas cowl 77 (FIG. 2) may be inserted into the mixer to reduce dust escape.

The lower end of conveyor 46 is hung by a means of yoke members 78-l,r to a pivot flange 80-l,r as secured rigidly to opposite side rails 30-l,r. The conveyor 46 includes opposite side rails 82-l,r with a conveyor belt supported therebetween in conventional manner, to terminate at the upper end in connection to the collector 74. The belt is movably supported by a lower end roller 84 and an upper end roller 86 as driven by hydraulic motor 44. A pair of support chains 88-l,r are connected between opposite side rails 82 of conveyor 46 and the front of tower 18, as will be further described, and this connection functions to move the conveyor 46 in conjunction with tilt control of the tower 18. During work operation, a suitable brace 90 as hingedly secured beneath opposite side rails 82-l,r is fastened to the cross beam 32 of main frame 12.

The tower 18 is supported at the bottom by a quadrature array of rearward support posts 92-l,r and forward support posts 94-l,r as they are secured at bottom ends to the respective opposite frame channel members 30-l,r as by welding. As can be noted in FIG. 2, the rearward support posts 92-l,r are of relatively heavy construction as they are formed of an interior beam or channel member 96 with heavy steel plates 98, 100 welded on each side. The opposite side plates 98, 100 extend upward over the end of beam 96 to provide respective clevis connections 102-l,r and 104-l,r, respectively. Only the parallel plates 98, 100 are used in the forward support posts 94-l,r to allow folding of the tower posts, as will be described.

Figure 3:
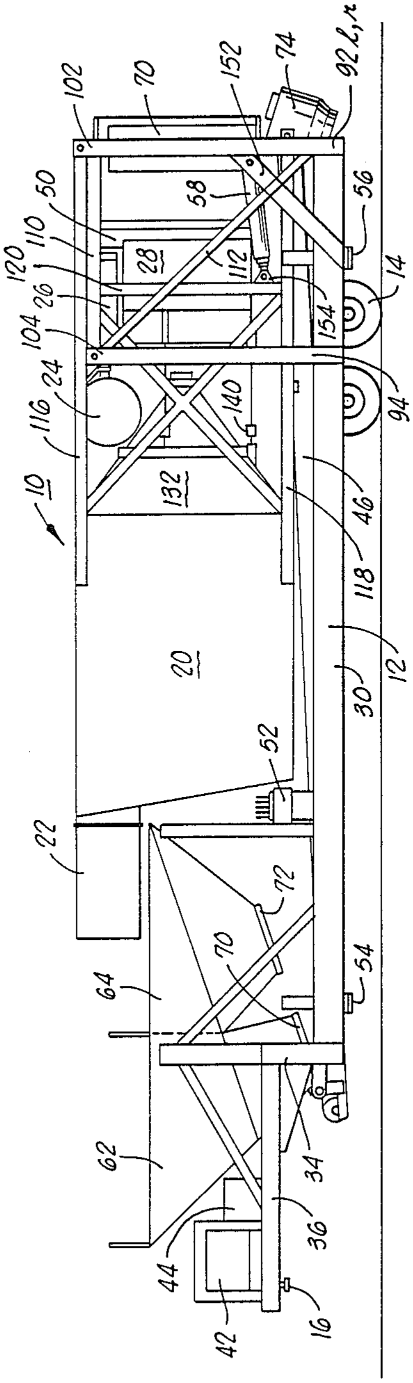
FIG. 3 is a side view in elevation of the concrete batching plant when it is folded down into the road transport attitude.

A pair of pivot plates 106 and 108 are welded to the rear support post 92-r to pivotally retain the control station or doghouse 70 so that the doghouse 70 can be swung outboard into the operative position as shown in FIG. 2 but pivoted inward within the truck entry space for roadway transport as shown in FIG. 3. Cross beams 110-l,r and angle braces 112-l,r are secured along with certain lateral angle braces 114 and gussets to provide transversal stability to the support posts.

The tower assembly 18 is supported primarily by a quadrature array of tower posts consisting of rearward tower posts 116-l,r and forward tower posts 118-l,r and these two are stabilized by a plurality of cross beams 120, 122 and angle braces 124, 126. The rearward tower posts 116 are pivotally connected into respective clevises 102 by hinge pins 126-l,r, and the forward tower posts 118-l,r are connected into forward clevises 104 by removable pins 128-l,r. Eye connectors 130-l,r are welded to respective forward tower posts 118 toward the upper extremities in order to secure the upper ends of conveyor support chains 88.

The tower 18 includes the concrete bin 20, e.g. a 275 barrel capacity bin, as welded securely atop the four tower posts 116, 118. The bin 20 extends a conical or pyrimidal lower portion 132 downward to terminate in a release gate 134. The release gate 134 may be such as a solenoid operated gate valve to release cement for gravity fall downward into weigh bin 28 through entry cowl 136. The gate 134 and entry cowl 136 are closely associated to avoid unnecessary loss of dust into the surrounds. The weigh bin 28 is supported by a plurality of rods 138 and load cells 140 secured beneath the pyramidal walls 132, and load cells 140 function to provide a weight measure signal for transmission down to the computer console within doghouse 70, as will be further described. The alloted cement is then moved by the hydraulically actuated screw 50 rearward for release at gate 142 downward through collector cowl 74 for direction into a waiting cement mixer truck.

Water tank 24, e.g. a five hundred gallon surge tank, is secured across the rear of the tower between the tower posts 116-1 and 116-r. An outside source of water is hose-connected to the surge tank 24, and a suitable form of float switch maintains an adequate water level therein. Water is released from tank 24 by means of a solenoid operated valve 144 through pipe 146 into the water weigh tank 26 which is also supported by rod/load cell connectors 148 that function to transmit a water weight signal downward to the control computer. Subsequent release of water from weigh tank 26 is effected by a valve conduit 150 which releases the water down through the collector cowl 74 for entry into the truck mixer assembly.

The telescoping cylinders 58-l,r are connected at an optimum angle for effecting raising and lowering of tower 18. Thus, the cylinders are connected to a corner brace 152-l,r at a point adjacent the rear support posts 92-l,r with the telescoping or active ends pivotally connected to a suitable connector 154-l,r as welded to the cross beam 120-l,r adjacent the juncture to the forward tower posts 118-l,r.

In operation, the batch plant apparatus 10 provides a mobile structure of relatively compact construction and reasonably narrow size such that it can be readily drawn by a towing vehicle over any standard-sized roads or highways. The apparatus has the additional advantages of being easily handled by a single person in set-up and take-down. FIG. 3 illustrates the apparatus 10 in its compacted, road-ready attitude, the tow vehicle not being shown. Upon arrival at the work site, and before uncoupling the tow truck, the operator energizes the engine 42 and the hydraulic and pneumatic power systems 44 whereupon operation of controls at the operator station 52 enables lowering of the hydraulic jacks 54 and 56 on both the left and right sides of apparatus 10. Fine adjustment leveling may be achieved with the hydraulics at control station 52 whereupon a plurality of screw jacks 156, four on the left side and four on the right side as shown, are installed and adjusted in firm leveling support of apparatus 10. At this point the tow truck can be uncoupled and the batch plant apparatus is ready for operation.

Figure 4:
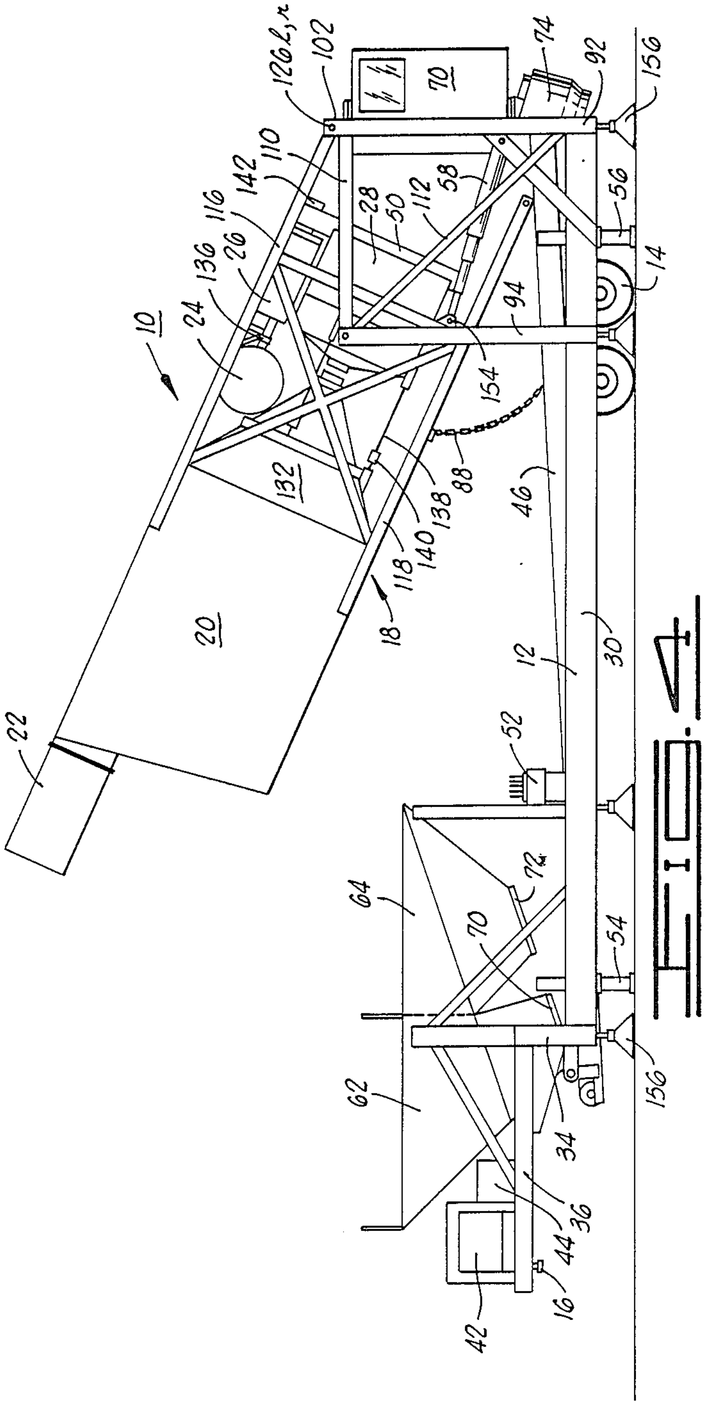
FIG. 4 is a side view in elevation of the batching plant during break-down operation when the tower assembly is about one-half collapsed.

The operator at station 52 then proceeds to energize the two telescoping cylinders 58-l,r. FIG. 4 shows partial elongation of the telescoping cylinders 58 as the tower assembly 18 is partially raised upward as the rearward tower posts 116-l,r revolve around hinge pins 126-l,r on the upper end of rearward support posts 92-l,r. The forward tower posts 118-l,r being disposed between respective plate pairs 98, 100, forming forward support posts 94-l,r, merely slide through as tower assembly 18 progresses upward.

When the tower assembly 18 approaches an angle of about 60° relative to the ground plane, the conveyor chains 88 become taut and commence lifting of conveyor 46 as tower assembly 18 proceeds toward its upright, locking position. When the upright position is achieved, the bottom hole in the forward tower post 118-l,r come into alignment with the clevis connection 104-l,r of the forward support posts 94-l,r and the respective removable keypins 128-l,r are inserted to lock the tower assembly 18 into operative position. Also, conveyor chains 88 have lifted conveyor 46 into operative position and the leg brace 90 can be released from its stowed, upward position and dropped down for pin engagement on a cross member 32 of main frame 12 thereby to provide reliable support during operation of the batching plant apparatus 10.

The doghouse 70 may then be swung from its stowed, inboard position (FIG. 3) towards the rear and around to an outboard position on the right hand side (FIG. 2) and the system is ready for functional operation. Dry concrete is blown in by conventional means through a tube or pipe leading up to concrete bin 20, and an outside source of water is connected to the water tank 24. Sand, coarse rock and the like is then input to the forward bins 62 and 64 by means of front end loader or auxiliary conveyor system and the apparatus 10 is ready for batching of concrete mix.

The doghouse 70 includes all controls and a central computer for operating the batch plant apparatus 10. The particular type of control system and computer is a type that is commercially available from Weigh Systems, Inc. of Elgin, Tex. The control system functions to proportion amounts of cement mix, aggregate (or sand) and water for release through collector cowl 74 downward into the mixer of a waiting mixer truck, as backed into the rear of the tower in the direction of arrow 76. The computer controls are capable of proportioning concrete mix in accordance with desired slump and consistency in any size batch up to a considerable number of yards, e.g. the capacity of the conventional truck mixer. Water in the water tank 24 is continually maintained by means of a suitable float valve controlling input from an outside source, and concrete mix and aggregate materials are supplied as needed to the main storage hoppers and bins.

Break down of the equipment is as easy as set-up. All mixed materials are first removed and washed where necessary to avoid concrete hardening problems. The support leg 90 is removed and stowed in its upward position beneath conveyor 46. The removable key pins 128-l,r are then removed as engine 42 and the hydraulics are energized, and the operator at station 52 exercises control over the multi-stage hydraulic cylinders 58-l,r to draw hydraulic fluid therefrom and retract the telescoping sections. The tower assembly 18 then progresses downward through attitudes shown in FIG. 4 and once again to that of FIG. 3 as conveyor chains 88 lower the conveyor downward into contact along main frame 12 as the entire tower assembly 18 lays horizontally thereon. Finally, the doghouse 70 is swung around rearwardly and forward into the access space between rearward support posts 92-l,r. The tow truck can then be connected with subsequent removal of screw jacks 156 and release of hydraulic jacks 54, 56, and when engine 42 is secured the rig is ready for road transport.

The foregoing discloses a novel form of concrete batch plant apparatus of a highly portable type that is easily handled by a single operator from transport through operational attitude and vice-versa. The apparatus is easily transformed between (1) a user friendly and road worthy apparatus or (2) a rugged batching plant that is capable of long term, heavy duty concrete batching usage at a specified location.

Changes may be made in combination and arrangement of elements as heretofor set forth in the specification and shown in the drawings; it being understood that changes may be made in the embodiments disclosed without departing from the spirit and scope of the invention as defined in the following claims.

The embodiments of the invention in which an exclusive property or privilege is claimed are as follows:

1. Cement batching apparatus for mobile deployment, comprising:

an elongated main frame having front, middle and rear portions and wheeled support structure;

a tower apparatus hingedly supported on the main frame rear portion to repose froward over the main frame middle portion and which includes a cement supply bin and weigh bin, and a water tank and weigh tank;

conveyor means hingedly secured at the main frame front portion and extending rearward to repose beneath said tower apparatus;

aggregate supply means secured to the main frame over said conveyor means at said main frame front portion;

a connector link secured between the tower apparatus and conveyor means; and hydraulic means connected to raise and lower said tower apparatus to operative and stowed positions relative to the main frame middle portion about an axis transverse to the main frame at the rear portion as sadi connector link effects simultaneous positioning of the conveyor between respective raised operative and lowered stowed positions.

2. Apparatus as set forth in claim 1 which further includes:

a control house hingedly secured at said main frame rear portion and pivotable about a vertical axis between a stowed position within the frame rear portion and a second operating position completely outside of the frame rear portion.

3. Apparatus as set forth in claim 2 which further includes:

control means operable from said control house to proportion the quantities of cement in said weigh bin, water in said weigh tank and aggregate material on said conveyor means.

4. Apparatus as set forth in claim 1 wherein said hydraulic means includes:

at least one hydraulic linear actuator pivotally connected between the main frame rear portion and the tower apparatus.

5. Apparatus as set forth in claim 4 which further includes:

an engine mounted on the main frame front portion;

a power source energized by said engine to provide hydraulic, pneumatic and electrical power outputs.

6. Cement batching apparatus for mobile deployment, comprising:

an elongated main frame having front, middle and rear portions with a supporting wheel structure mounted at the rear portion and tow connection structure secured at the front portion;

four vertical support posts disposed in quadrature array and secured to the main frame rear portion to extend respective forward and rearward pairs of upper ends;

four tower posts disposed in quadrature array with two of said posts hingedly secured to the rearward pair of support post upper ends, and the remaining two tower posts releasably secured to said forward pair of support post upper ends;

a first bin for releasable cement containment with a weigh tank in communication and a water tank and water weigh tank, all supported in operative alignment within said four tower posts;

a hopper for release of aggregate material supported over said main frame front portion;

an elongated conveyor means having front, middle and rear portions with the front portion hingedly affixed to the main frame front portion beneath said hopper to receive released aggregate, and the rear portion retentively supported within said remaining two tower posts in disposition beneath said cement weigh tank;

collector means secured to the rear portion of said conveyor means and disposed to direct cement, water and aggregate materials;

a hydraulic power source mounted on said main frame; and at least one extensible hydraulic actuator having first and second ends with the first end connected to a rearward support post and the second end connected to a releasably secured forward tower post;

whereby said at least one actuator can be operated to retract or extend thereby to move said forward tower posts between a first position with the tower posts and first bin, water storage tank and weigh tanks resting on the main frame mid-portion and a second position with the tower posts erect.

* * * * *